United States Patent [19]

Im

[11] Patent Number: 5,307,910

[45] Date of Patent: May 3, 1994

[54] MANUALLY OPERATED CLUTCH AND BRAKE

[76] Inventor: Kwan-Soon Im, 79 Fortieth Street, Etobicoke, Ontario, Canada, M8W 3M8

[21] Appl. No.: 30,718

[22] Filed: Mar. 12, 1993

[51] Int. Cl.[5] .................. F16D 67/02; F16D 21/02
[52] U.S. Cl. .................. 192/13 R; 192/18 R; 192/51; 192/94
[58] Field of Search .............. 192/12 R, 13 R, 18 R, 192/19, 51, 94

[56] References Cited

U.S. PATENT DOCUMENTS

| 1,191,893 | 7/1916 | Harriman | 192/94 |
|---|---|---|---|
| 1,232,472 | 7/1917 | Allen . | |
| 1,299,502 | 4/1919 | Olsen | 192/94 X |
| 1,509,768 | 9/1924 | Overman . | |
| 2,008,873 | 7/1935 | Nydegger | 192/18 R |
| 2,043,568 | 6/1936 | Yager et al. | 192/18 R X |
| 3,256,949 | 6/1966 | Petersen | 192/51 X |
| 3,744,760 | 7/1973 | Uher | 192/19 X |
| 3,920,263 | 11/1975 | Bundschuh . | |
| 3,941,075 | 3/1976 | Rupenian . | |
| 4,274,620 | 6/1981 | Uher | 192/94 X |
| 4,451,064 | 4/1984 | Perkins . | |
| 4,706,982 | 11/1987 | Hartmann . | |
| 4,826,190 | 4/1989 | Hartman . | |

FOREIGN PATENT DOCUMENTS

| 992250 | 10/1951 | France | 192/51 |
|---|---|---|---|
| 1025869 | 4/1966 | United Kingdom | 192/18 R |

*Primary Examiner*—Richard M. Lorence
*Attorney, Agent, or Firm*—Riches, McKenzie & Herbert

[57] ABSTRACT

The invention relates to torque transmission device which is manually controlled in response to a differential in rotational velocity between a shaft and an actuating plate mounted on the shaft. The device acts as a deadman brake, clutch and/or as a power assist for various mechanically driven manually controlled devices. The device comprises a shaft having a longitudinal axis, forward and rearward ends. An input plate journalled to rotate, under motive force, about the axis at a position longitudinally fixed and forward relative to the shaft. A forward clutch plate is mounted for rotation with the shaft and reciprocating longitudinal motion on the shaft rearward of the input plate. An actuating plate is mounted on the shaft rearward of the forward clutch plate. The shaft and actuating plate interact with threads to move the actuating plate longitudinally relative to the shaft in response to a differential in rotational velocity between the shaft and actuating plate. As a result forward and rearward motion of the actuating plate respectively urges the forward clutch plate forwardly to engage the input plate and rearwardly to disengage the input plate.

12 Claims, 4 Drawing Sheets 5,307,910

MANUALLY OPERATED CLUTCH AND BRAKE

FIELD OF THE INVENTION

The invention relates to a torque transmission device which is controlled in response to a differential in rotational velocity between a shaft and an actuating plate.

BACKGROUND OF THE INVENTION

Various types of machinery are extremely dangerous to operate unless closely monitored and controlled by a human operator If the operator's attention is diverted momentarily, or if the operator is injured, it is an essential feature of many types of machinery that a "deadman" switch immediately discontinues operation of the machinery.

For example forging machinery, cranes, metal stamping presses, bulldozers, etc. are recognized as being extremely dangerous unless closely monitored by an attentive operator. Often a deadman switch is a simple spring loaded throttle or hydraulic lever which when released immediately returns to a neutral or brake position. Electric switches are often used as well. For example in punch presses where the operator's two hands must be positioned away from dangerous machinery on two operating buttons simultaneously or the operation of the punch press will immediately be arrested by electric switching means.

Safe design of motorized childrens toy vehicles also include deadman switches. Battery operated vehicles in which children are seated often include a spring loaded imitation throttle which returns to a brake position when released.

A distinct disadvantage of a spring loaded lever type deadman switch is experienced if an operator falls or leans upon the switch. Such a condition may occur during a heart attack for example or, in the case of childrens vehicles, a confused and frightened child may not appreciate that they are leaning against the throttle or that it should be released. Spring loaded deadman switch levers also depend entirely upon springs and other mechanical means to ensure the safety of operation. Such switches may be damaged or tampered with thereby posing significant risk to the operator and those in the immediate vicinity.

Use of electrically operated deadman switches suffer from the disadvantages of all electrical devices in that they are often delicate, must be protected from water and explosion hazards, and control wires are often exposed to damage or corrosion in various applications. In respect of childrens toys often run by batteries, electric switches and controls are notorious for their propensity to be easily rendered inoperable by the simple playful activities and curiosity of innocent children. In industrial applications the expense of constructing a robust waterproof and damage resistant electrical components may be justifiable, however the extremely competitive childrens toy market often results in electrical components having a disappointing short service life.

In many mechanical applications torque transmission devices include clutches, fly wheels, brakes and control means as separate components resulting in a complex assembly. In mass produced items such as childrens toys for example the labour component in assembling such complex transmissions becomes significant.

The ultimate purchaser is often required to keep a stock of spare parts for maintenance and must have a relatively sophisticated capability to maintain such equipment. The complexity of transmission devices is especially disadvantageous when applied to low cost mechanical equipment or toys, or where such equipment will be used in remote areas.

Simplicity of design and ease of maintenance are essential in certain circumstances when the operator is required to maintain the equipment in locations where access to spare parts is limited or costs are prohibitive. It is therefore desirable to construct a transmission device having a deadman switch capability and being relatively simple to maintain and construct.

In many applications in addition to having a deadman capability it may be desirable to design control means such that the operator perceives a direct connection between their movement and the movement of the machinery. For example in a pedal powered childrens toy it may be desirable to include power assist means. The child intuitively appreciates the control function of the pedals in proceeding forward, rearward and stopping.

Motorized wheelchairs and other vehicles for use by the handicapped often do not recognize the psychological benefits of the perception by the operator that a motorized device is operated in a manner substantially the same as a manually driven wheelchair, for example, without the requirement for a high level of physical exertion. In the case of wheelchairs for example, a handicapped person is currently forced to choose between a conventional manually powered wheelchair and a completely motor driven version. If a handicapped person does not possess the required upper body strength to manipulate a manual wheelchair the psychological effect of forcing reliance on a motorized means of transport may be significant.

The operators of industrial and construction machinery may fail to maintain an adequately safe level of attentiveness due to the repetitive nature of their work. It is desirable therefore that means be provided to ensure that operators pay attention to their activities at all times and that machinery controls include a deadman capability.

SUMMARY OF THE INVENTION

The invention overcomes the disadvantages of the prior art in a novel manner in the provision of a torque transmission device which is manually controlled in response to a differential in rotational velocity between a shaft and an actuating plate mounted on the shaft. The device acts as a deadman brake, clutch and/or as a power assist for various mechanically driven manually controlled devices. The device comprises a shaft having a longitudinal axis, forward and rearward ends. An input plate journalled to rotate, under motive force, about the axis at a position longitudinally fixed and forward relative to the shaft. A forward clutch plate is mounted for rotation with the shaft and reciprocating longitudinal motion on the shaft rearward of the input plate. An actuating plate is mounted on the shaft rearward of the forward clutch plate. Actuating means interconnect the shaft and actuating plate and move the actuating plate longitudinally relative to the shaft in response to a differential in rotational velocity between the shaft and actuating plate. As a result forward and rearward motion of the actuating plate respectively urges the forward clutch plate forwardly to engage the input plate and rearwardly to disengage the input plate. Preferably the device also includes a counter clutch plate such that forward and rearward motion of the actuating plate respectively urges the counter clutch plate forwardly to disengage the counter output plate and rearwardly to engage the counter output plate.

Further aspects of the invention will become apparent upon review of the following detailed description.

BRIEF DESCRIPTION OF THE DRAWINGS

In order that the invention may be readily understood, a preferred first embodiment and alternative second embodiment of the invention will be described by way of example with reference to the accompanying drawings in which:

FIG. 4 is an exploded perspective view of an application of the invention to a child's motorized toy tractor.

DETAILED DESCRIPTION OF PREFERRED EMBODIMENTS OF THE INVENTION

The application of the invention will be described as applied to a pedal controlled child's toy as shown in FIG. 4, however, it will be understood that the torque transmission device has many other applications as explained above for example as a deadman switch on industrial machinery such a forging presses or punch presses, or lifting cranes.

It will also be understood that although the description herein relates to manually operable control means in the form of pedals, any other means of rotating the actuating plate or shaft may be used to equal advantage. Such control means may include for example a reciprocating treddle, steering wheels, hand wheels attached to wheelchairs or cranks on fishing reels.

Figure 1:
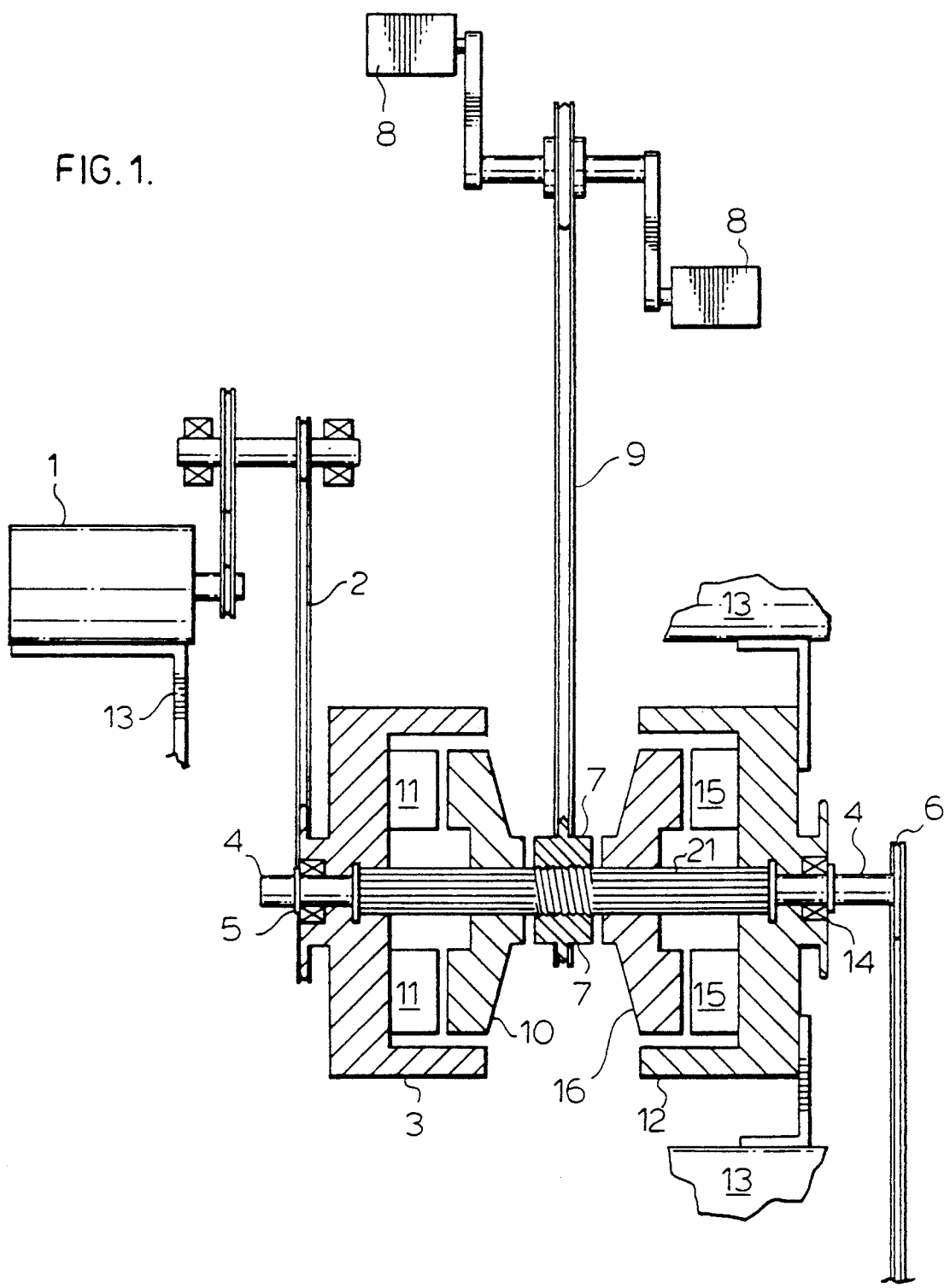
FIG. 1 is a schematic partially sectional view, of a device in accordance with a first embodiment, along the plane of the longitudinal axis of the shaft.

In the embodiment illustrated in FIG. 1 a motor 1 of any type rotates a drum like input plate 3 via transmission gearing 2. The input plate 3 rotates on a shaft 4 supported by bearings 5. A power take off gear 6 is attached to the shaft 4. The gear 6 is used in a conventional manner to drive various types of mechanical devices.

Figure 2:
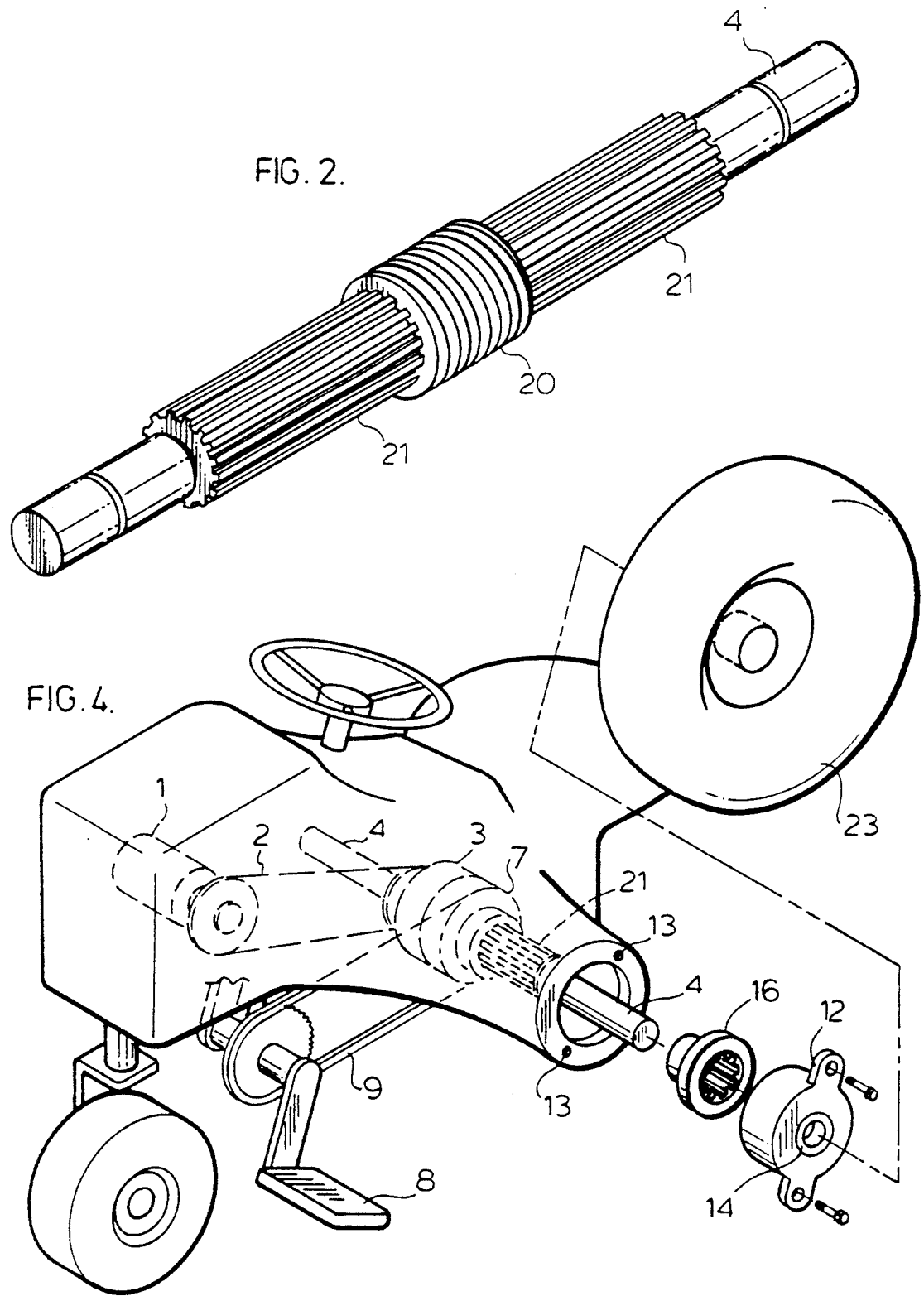
FIG. 2 is a detail perspective view of the shaft.
Figure 3:
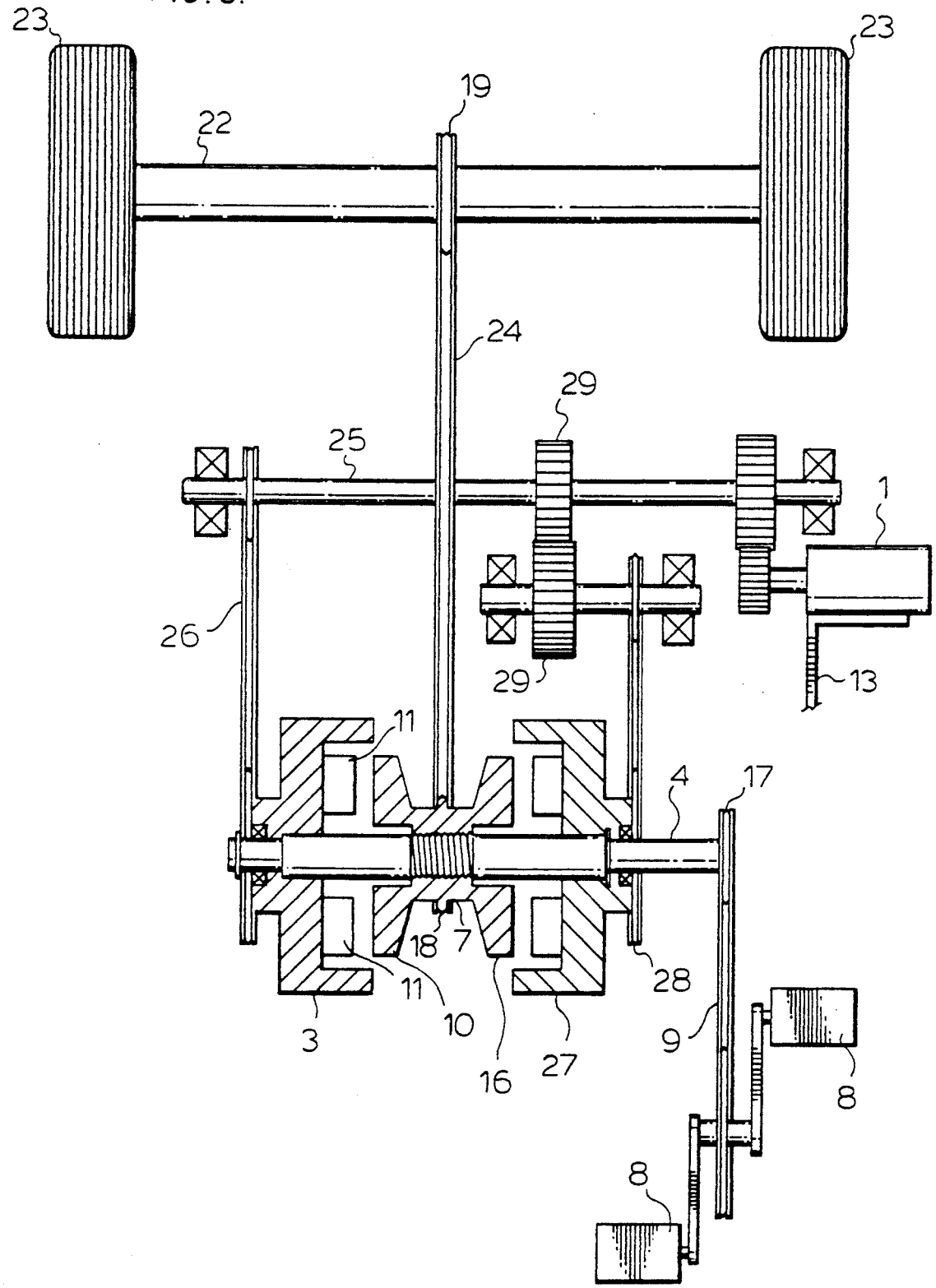
FIG. 3 is a schematic view of a second embodiment in accordance with the invention.
Figure 6:
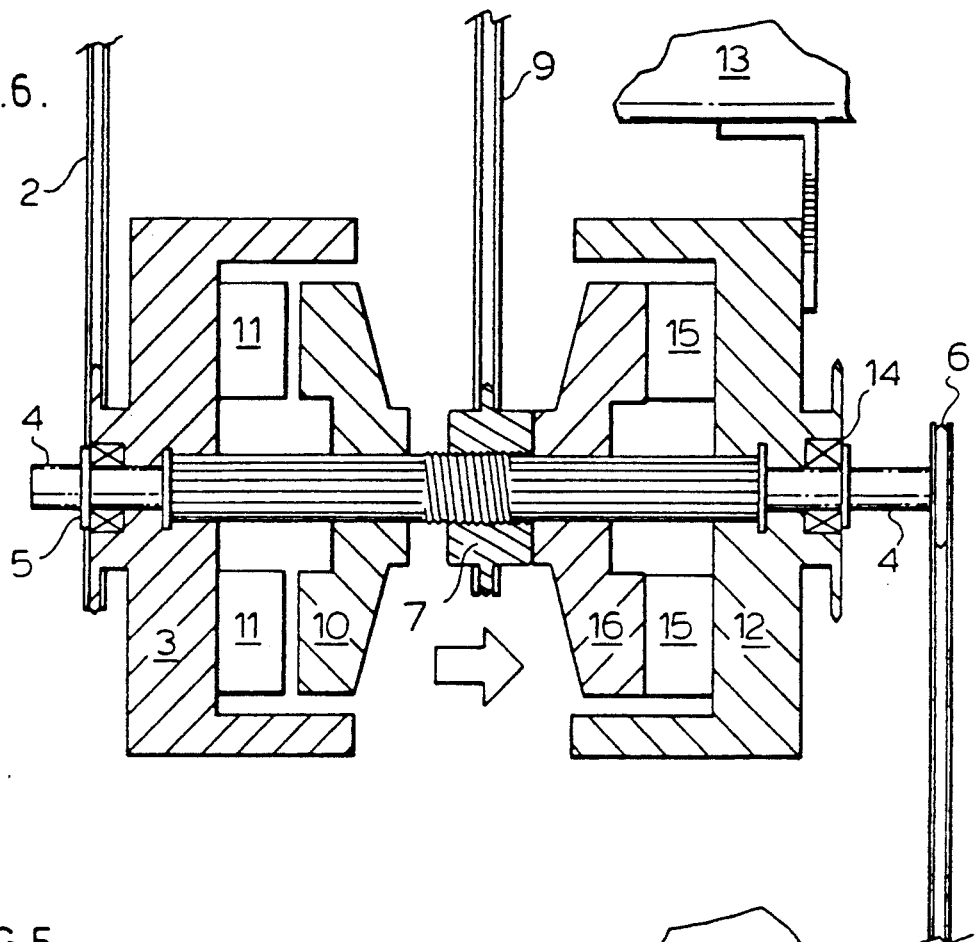
FIGS. 5 and 6 are views similar to FIG. 1 showing respectively the movement of the actuating plate engaging the forward clutch plate and the brake plate.
Figure 5:
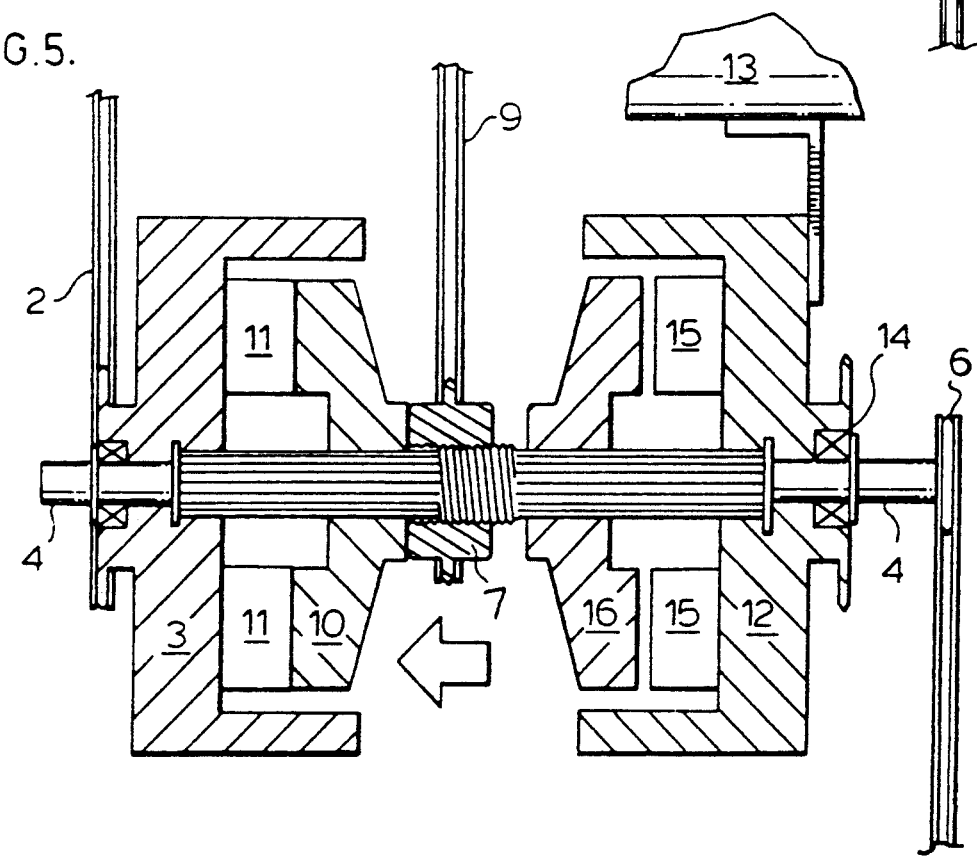

With reference to FIGS. 1, 2 and 3, in the central portion of the shaft 4 is a threaded portion 20 bounded on each side by splined shaft portions 21. On the threaded shaft portion 20 a like threaded actuating plate 7 is positioned. The actuating plate 7 is rotated by rotation of the pedals 8 and manually operated drive chain 9. When the shaft 4 is stationary, rotation of the pedals 8 causes the actuating plate 7 to shift to the left or right as drawn depending upon the direction of rotation and the orientation of the threads. Between the actuating plate 7 and input plate 3 is a forward clutch plate 10. The forward clutch plate 10 is slidably housed upon the splined portion 21 of the shaft 4.

In order to engage the forward clutch plate 10 and commence rotation of the take off gear 6, rotation of the motor 1 is commenced and the input plate 3 then freely rotates upon the stationary shaft 4. Pedals 8 are rotated, and as a result the actuating plate 7 rotates upon the stationary shaft 4, and in so doing, the actuating plate 7 shifts to the left on the shaft 4 urging the forward clutch plate 10 to slide upon the shaft 4 into engagement with the friction plates 11 of the rotating input plate 3. As the friction plate 11 and forward clutch plate 10 engage, the rotation of the input plate 3 is transferred to the forward clutch plate 10 which then commences rotation and, as a result of the interacting splines, thereby rotates the shaft 4.

It will be apparent therefore in order to maintain engagement of the input plate 3 and forward clutch plate 10, the actuating plate 7 must be rotated in the appropriate direction and at a rotational velocity at least equal to that of the shaft 4 rotation by continuing to drive the pedals 8.

Referring to FIG. 4 therefore, a child pedalling the pedals 8 of the toy tractor is required to pedal at a speed such that the actuating plate 7 is rotated at a rotational velocity at least equal to that of the shaft 4. As a result the engagement of the input plate 3 and forward clutch plate 10 are maintained.

The child intuitively perceives that their pedalling effort results in the forward motion of the vehicle. However, it will be understood that, due to the motive force exerted by the motor 1, the force rotating the shaft 4 is in fact provided by the motor 1.

The pedalling effort of the child merely maintains the forward clutch plate 10 against the friction plate 11 of the input plate 3. Such pedalling effort of course is of a much lesser degree than that required to drive the vehicle without the assistance of the motor 1, especially uphill or over rough ground.

The perception of the child remains that their pedalling effort drives the vehicle, much like the perception of a driver in an automobile having power assisted brakes and steering. The child is required to pedal the device in order to achieve forward motion, however the operation of the motor 1 assists in providing the power necessary to drive the vehicle.

Braking means are also provided as illustrated to the right of the actuating plate 7 in FIG. 1. It will be apparent that conventional braking means may be provided within the scope of the invention described briefly above. The invention may be adapted for a variety of transmission selections between its left and right portions, as for example: forward-brake; forward-reverse; and low speed forward-high speed forward.

A stationary brake plate 12 is longitudinally fixed in position relative to the shaft 4. As illustrated the brake plate 12 is mounted to resist rotation by bolting it to the frame 13 of the toy tractor vehicle.

As illustrated the shaft 4 is rotatably journalled in the brake plate 12 on the bearings 14. Friction brake pads 15 are provided for engagement with a counter rotational output plate 16. The counter output plate 16 is interconnected with the shaft 4 by mating splines on the splined portion 21 to the right of the threaded portion 20.

The operation of the braking means in co-ordination with the clutch means described above is as follows. When the shaft 4 is stationary, rotation of the actuating plate 7 in a reverse direction shifts the actuating plate 7 toward the counter clutch plate 16. As a result the counter clutch plate 16 slides upon the right side splined shaft portion 21 and engages the stationary brake pads 15.

When the shaft 4 is rotating, the actuating plate 7 must be rotated at a speed at least equal to a shaft rotation in order to maintain engagement of the forward clutch plate 10 and rotating input plate 3. If the operator ceases to pedal, rotation of the actuating plate 7 ceases. Inertial forces will continue to rotate the shaft 4 for a short period of time. As a result, the rotation of the shaft 4 will shift the nonrotating actuating plate 7 towards the right urging the rotating counter clutch plate 16 to engage the stationary brake plate 12.

Conceptually the invention as described above may be considered as a combination of a clutch and brake.

It will be apparent as shown in FIG. 1 that if the brake plate 12 is not connected to the stationary vehicle 13, engagement of the counter clutch plate 16 and friction pads 15 will result in rotation of the brake plate 12. As such the component identified as brake plate 12 may be considered as a reverse output plate if connected to means to transmit the rotation of the reverse output plate 12 to the wheels of a vehicle. Therefore conceptually such an embodiment of the device may be described as a combination of forward and reverse clutches. In that case, conventional brake means would be required in association with a vehicle incorporating such a device.

Since the movement of the actuating plate 7 relative to the shaft 4 is in response to a differential and rotational velocity between the shaft 4 and actuating plate 7, the power take off means and control means can be alternated between the shaft 4 and actuating plate 7 as shown in the first and second embodiments in FIGS. 1 and 3. A differential and rotational velocity between the shaft 4 and actuating plate 7 may be effected by manually operable control means coacting with the actuating plate 7 for rotating the actuating plate 7 as illustrated in FIG. 1. In such a case the power take off gear 6 is mounted for rotation with the shaft 4.

Alternatively as illustrated in FIG. 3 manually operable control means may take the form of control gear 17 mounted on the shaft 4 for rotating the shaft 4. In such an embodiment power take off means in the form of an external sprocket coacts with the actuating plate 7. In the embodiment illustrated in FIG. 3 the external sprocket 18 on the actuating plate 7 interacts with a like sprocket 19 mounted on a vehicle axle 22 to drive vehicle wheels 23.

It will be understood that FIG. 3 and FIG. 1 are merely schematics and that various practical embodiments are encompassed within the scope of the teaching of this invention which would include mechanical equivalents. For example the chain 24, actuating plate 7 and other associated moving parts may advantageously be housed within an enclosure.

Referring to FIG. 3 in detail, a shaft 4 has a longitudinal axis, and forward and rearward ends as drawn respectively to the left and right.

An input plate 3 is journalled to rotate about the axis at a position longitudinally fixed and forward relative to the shaft 4. Motive force to rotate the input plate 3 is provided by the motor 1, transmission gearing 2, transfer shaft 25 and forward drive chain 26.

A forward clutch plate 10 is mounted for rotation with the shaft 4 and for reciprocating longitudinal motions on the shaft 4 rearward of the input plate 3. The actuating plate 7 is mounted on the shaft 4 rearward of the forward clutch plate 10.

In the embodiment illustrated in FIG. 3 the forward clutch plate 10 and actuating plate 7 are bolted together whereas in the embodiment in FIG. 1 they remained independent. The reason for this different construction is due to the differences in the control means and the power take off means.

In FIG. 3 a power take off external sprocket 18 drives the vehicle wheels 23. The operator manually controls the differential in rotational velocity between the shaft 4 and actuating plate 7 by pedalling on the pedals 8.

In the embodiment illustrated in FIG. 1 in contrast the operator manually controls the differential and rotational velocity by rotating the actuating plate 1 by peddalling on pedals 8. In contrast the power take off gear 6 is mounted on the shaft 4 and drives various types of machinery.

In both cases therefore there is a direct mechanical link between the forward clutch plate 10 and the power take off means (6, 18) provided. It will be apparent therefore that in FIG. 4 the shaft 4 need not include the splined portion 21 but only the threaded portion 20, to accommodate the mating threads on the interior bore of the actuating plate 7.

As best illustrated in FIG. 2, mating threads on an exterior threaded portion 20 of the shaft 4 and an interior bore of the actuating plate 7 interconnect the shaft 4 and actuating plate 7. In response to a differential in the rotational velocity between the shaft 4 and actuating plate 7, the interconnecting threads move the actuating plate 7 longitudinally relative to the shaft 4.

In the embodiment illustrated in FIG. 3 the input plate 3 is rotated under the motor force of the motor 1 through the mechanical means described above. In order to commence rotation of the vehicle wheels 23 the operator commences peddling on pedals 8. The control gear 17 and shaft 4 commence rotation. It will understood at this point that the actuating plate 7 and associated forward clutch plate 10 are stationary. The rotation of the shaft 4 moves the actuating plate 7 towards the left as shown as a result of the interconnecting threads between the shaft 4 and actuating plate 7.

As a result the forward and rearward motion of the actuating plate 7 respectively urges the forward clutch plate 10 forwardly to engage the input plate 3 and rearwardly to disengage the input plate 3. On engaging and maintaining engagement between the friction plate 11 and the forward clutch plate 10 the vehicle wheels 23 commence rotation.

In order to maintain forward motion of the vehicle the operator is required to pedal on the pedals 8. As described above in respect of the embodiment illustrated in FIG. 1, it is also the case in the embodiment illustrated in FIG. 3 that the operator is required to maintain the rotational velocity of the shaft 4 and actuating plates 7 at an equal level.

Assuming that the vehicle is maintaining a forward motion the wheels 23 will continue their rotation. When the operator ceases pedalling and the shaft 4 becomes stationary. The actuating plate 7 will continue rotating under the inertial force of the rotating vehicle wheels 23 for a short period of time. As a result the actuating plate 7 will urge the forward clutch plate 10 to move rearwardly and disengage the input plate 3.

It will also be apparent that the embodiment illustrated in FIG. 3 could include a brake plate 12 analogous to the brake plate 12 illustrated in the embodiment of FIG. 1. In such a case the rearward disengagement of the forward clutch plate 10 would result in a braking of the vehicle motion.

As an alternative however FIG. 3 illustrates an optional reverse drive to stop the vehicle's motion and alternatively reverse the vehicle. In such a case conventional braking means would be provided (not shown).

As described above in respect of the first embodiment illustrated in FIG. 1, the second embodiment illustrated in FIG. 3 also includes a counter clutch plate 16 which is mounted for rotation with the shaft 4 and reciprocating longitudinal motion on the shaft 4 rearward of the actuating plate 7. A counter output plate 27 is provided rearward of the counter clutch plate 16.

In the embodiment illustrated in FIG. 1 the counter output plate is a brake plate 12 longitudinally fixed in position relative to the shaft 4 and mounted to resist rotation when engaged with the counter clutch plate 16. In the second embodiment illustrated in FIG. 3 the counter output plate is a reverse output plate 27 longitudinally fixed in position and free to rotate relative to the shaft 4.

As shown in FIG. 3 the motor 1 drives the transverse shaft 25. The counter output plate 27 includes an external sprocket 28 which is driven in an opposite rotational direction to the input plate 3 by reverse gearing 29. Forward and rearward motion of the actuating plate 7 therefore respectively urges the counter clutch plate 16 rearwardly to engage the reverse output plate 27 and forwardly to disengage the reverse output plate 27.

As a result left and right motion of the actuating plate 7 drives the vehicle respectively in a forward and reverse direction.

In both embodiments illustrated the input plate 3 is rotatably journaled upon the shaft 4 for ease of construction. In a similar manner the reverse output plate 27 is rotatably journaled upon the shaft 4. It will be understood that this is not a mechanically essential feature however, since alignment of the input plate 3, forward clutch plate 10, counter clutch plate 16 and brake plate 12 or reverse plate 27 is necessary for proper operation, it is convenient to mount all such components on a common shaft 4.

According to the above description the torque transmission device according to the invention provides a simply constructed and maintained mechanical equivalent to a clutch with deadman switch capability. The operator at all times is require to positively provide input to maintain the operation of machinery controlled by the device. In the embodiment illustrated the operator is required to continuously rotate the pedals 8 in order to maintain engagement to transmit torque through the device. The operator ceases to provide such controlling input a brake is automatically applied in the embodiment illustrated in FIG. 1 or reverse drive is commenced in embodiment illustrated in FIG. 3.

It will be apparent that the embodiment illustrated in FIG. 3 will shift back and forth between forward and reverse if the shaft 4 ceases rotation until the actuating plate 7 is moved to a position where it disengages both the input plate 3 and reverse plate 27. Such an equilibrium will only be reached when the vehicle wheels 23 cease rotation.

When the torque transmission device described above is applied, for example to a children's pedalled toy vehicle, the child will perceive the pedalling effort that they exert as having a direct relationship with the forward and rearward motion of the vehicle. The deadman switch capability of the device is advantageously used since when the child stops pedalling, a brake is applied. This is unlike directly pedalled child's toys. In that case when the child ceases pedalling, they must maintain pressure on the pedals to prevent the pedals from being turned by the wheels. In the example of children's toys used there is a risk that the child will not have enough co-ordination or foresight to apply a separate brake or otherwise halt the rotation of the pedals. The invention therefore provides a means to assist in the motor driven rotation of vehicle wheels while maintaining the perception of the child operator that their pedalling effort clearly controls the motion of the vehicle.

Although the invention has been described in association with an example of a childs toy vehicle there are several other apparent applications of the torque transmission device. For example in the case of wheel chair described above it may be very beneficial to the operator to maintain the perception that their physical exertion has a direct relationship with the motion of the vehicle. The invention allows the maintenance of this perception with the provision of a motorized wheelchair thereby reducing the level of physical exertion required by the user. The user may rotate the manually operable control means of the device in a manner substantially equivalent to that used in a manually driven wheelchair.

Another example of application of the device could be in fishing reels used for deep sea fishing. Quite often the physical effort required to reel in a large fish exceeds the physical abilities those who would otherwise enjoy the sport. By providing a power driven reel with torque transmission device according to the invention the user retains the perception that their physical effort, in rotating the manually operable control means, has a direct relationship with the operation with the reel.

In all cases described above the physical effort expended by the operator is merely required to maintain engagement of the input plate 3 and forward clutch plate 10. The actual mechanical effort required to operate the machinery is expended by the motor 1.

Various industrial applications are also apparent for example in the operation of a lifting crane which reels in cable or chain in a manner substantially similar to the fishing reel described above. The operator is at all times required to expend physical effort to continue operation of the machinery. As a result the operator attention is at all times directed to their physical effort and the resultant movement of the machine controls.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A torque transmission device comprising:
   a shaft having a longitudinal axis, forward and rearward ends;
   an input plate journalled to rotate, under motive force, about said axis at a position longitudinally fixed and forward relative to the shaft;
   plate mounted for rotation with the shaft and reciprocating longitudinal motion on the shaft rearward of the input plate;
   an actuating plate mounted on the shaft rearward of the forward clutch plate; and
   actuating means, interconnecting the shaft and actuating plate, for moving the actuating plate longitudinally relative to the shaft in response to a differential in rotational velocity between the shaft and actuating plate, whereby forward and rearward motion of the actuating plate respectively urges the forward clutch plate forwardly to engage the input plate and rearwardly to disengage the input plate.

2. A device according to claim 1 comprising:
manually operable control means coacting with the actuating plate for rotating the actuating plate; and
power take-off means mounted for rotation with the shaft.

3. A device according to claim 1 comprising:
manually operable control means mounted on the shaft for rotating the shaft; and
power take-off means coacting with the actuating plate.

4. A device according to claim 1 wherein the actuating means comprise mating threads on an exterior portion of the shaft and an interior bore of the actuating plate.

5. A device according to claim 1 further comprising:
a counter clutch plate mounted for rotation with the shaft and reciprocating longitudinal motion on the shaft rearward of the actuating plate; and
a counter output plate rearward of the counter clutch plate;
whereby forward and rearward motion of the actuating plate respectively urges the counter clutch plate forwardly to disengage the counter output plate and rearwardly to engage the counter output plate.

6. A device according to claim 5 wherein the counter output plate is a brake plate longitudinally fixed in position relative to the shaft and mounted to resist rotation when engaged with the counter clutch plate.

7. A device according to claim 5 wherein the counter output plate is a reverse output plate longitudinally fixed in position, and free to rotate relative to the shaft.

8. A device according to claim 2 wherein the shaft and forward clutch plate are interconnected with mating longitudunal splines on the exterior of the shaft and an interior bore of the forward clutch plate.

9. A device according to claim 5 wherein the shaft and counter clutch plate are interconnected with mating longitudunal splines on the exterior of the shaft and an interior bore of the counter clutch plate.

10. A device according to claim 1 wherein the input plate is rotatably journalled upon the shaft.

11. A device according to claim 6 wherein the shaft is rotatably journalled in the brake plate.

12. A device according to claim 7 wherein the reverse output plate is rotatably journalled upon the shaft.

* * * * *